May 27, 1969
J. J. ENDLER
3,446,877
PROCESS FOR PRODUCING PRILLS
Filed April 28, 1967
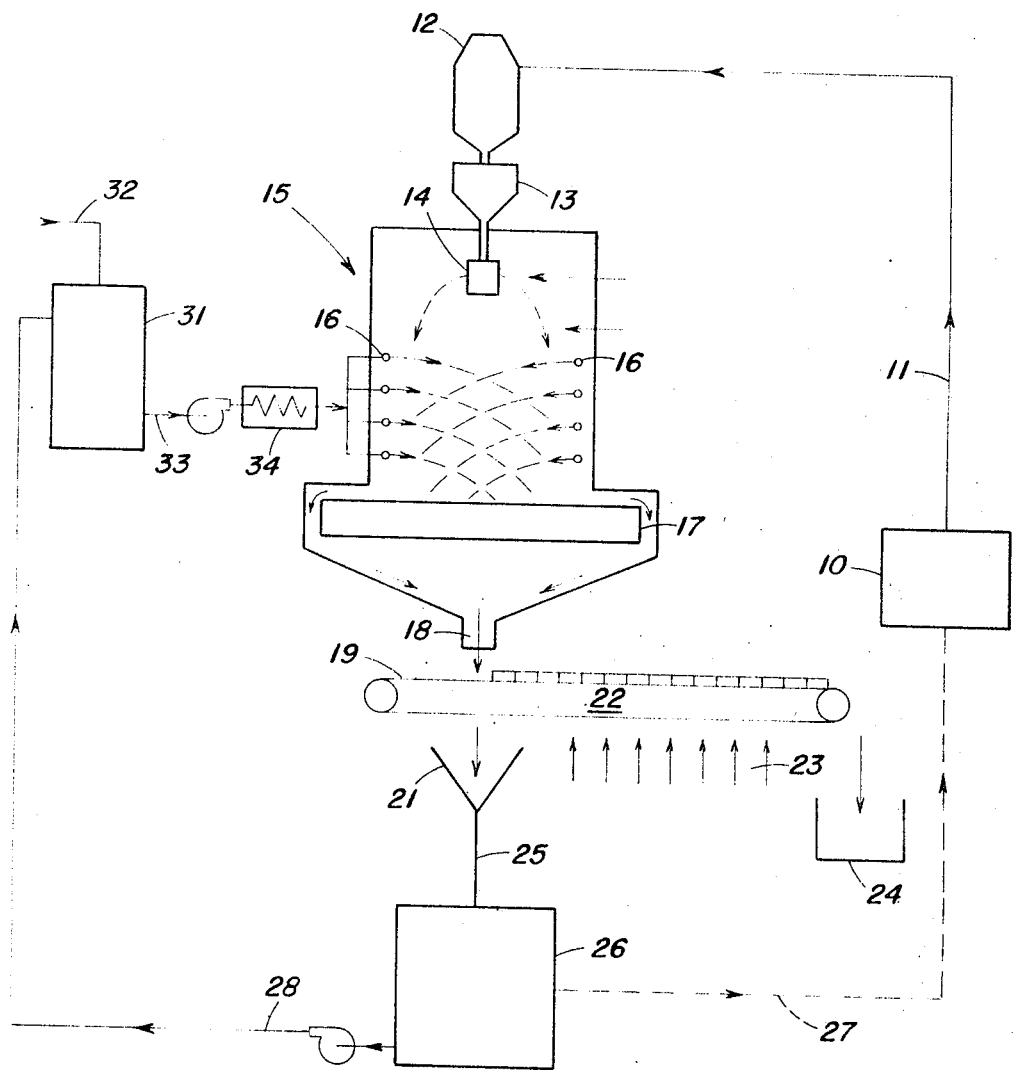
INVENTOR.
J. J. Endler
BY
Marn & Jangarathis
ATTORNEYS United States Patent Office 3,446,877
Patented May 27, 1969

3,446,877
PROCESS FOR PRODUCING PRILLS
John J. Endler, Mountain Lakes, N.J., assignor to The Lummus Company, New York, N.Y., a corporation of Delaware
Filed Apr. 28, 1967, Ser. No. 634,666
Int. Cl. B22d 23/08
U.S. Cl. 264—8                                     12 Claims

ABSTRACT OF THE DISCLOSURE

A process for producing urea prills wherein urea droplets are contacted with a liquid heat transfer medium to effect solidification thereof. Molten urea is introduced into a prilling chamber as a plurality of droplets and while falling through the chamber are contacted with a spray of an inert liquid heat transfer medium in which the urea both floats and is insoluble. The urea and heat transfer medium fall into a pan containing a circulating pool of the heat transfer medium and urea prills are withdrawn from the pan floating on the heat transfer medium. The prills are separated from the heat transfer medium and the heat transfer medium recycled to the prilling chamber.

This invention relates to the production of prills, and more particularly, to the production of urea prills.

Urea prills are produced by passing molten urea through a device, such as a spray head, positioned within a tower. The spray head, rotating basket and the like provides a plurality of discrete urea droplets which fall through the tower (generally having a height of over one hundred feet) in countercurrent contact with cool air introduced into the bottom of the tower. During such contact, the urea droplets solidify thereby forming urea prills which are withdrawn from the bottom of the tower. Although this operation effectively produces urea prills, the necessity for the large tower increases capital cost, and accordingly, increases the overall cost of the operation.

An object of this invention is to provide a new and improved process for producing urea prills.

Another object of this invention is to provide a new process for producing urea prills that eliminates the tower.

These and other objects will become more readily apparent from the following detailed description of the invention when read with reference to the accompanying drawing wherein:

The drawing is a schematic representation of an embodiment of the invention.

The objects of this invention are broadly accomplished by contacting a plurality of discrete droplets of molten urea with a heat transfer medium which is at a temperature below the melting point of urea, the urea droplets and heat transfer medium being maintained in contact with each other until solidification is effected. In accordance with one embodiment of the invention, the urea droplets are contacted during free fall through the surrounding atmosphere with a spray of an inert liquid heat transfer medium in which urea is insoluble and which is at a temperature sufficiently below the melting point of urea to effect rapid solidification of the urea droplets. In accordance with a preferred embodiment, a plurality of discrete droplets of molten urea are introduced into a pool containing an inert liquid heat transfer medium having a density higher than urea and in which urea is insoluble. The heat transfer medium is maintained at a temperature sufficiently below the melting point of urea to effect relatively rapid cooling of the urea droplets. The urea droplets consequently float on the medium during solidification. After solidification has been effected, the solidified urea, in the form of prills, is removed from the pool and dried.

In a pool type of operation, the heat transfer medium may be employed either as a fixed or as a circulating pool, with the circulating pool being preferred. In the former case, the pool is maintained at a temperature between about 50° F. and about 130° F. by passing a suitable heat transfer agent in an indirect heat transfer relationship with the fixed pool. In the latter case, a pool inlet temperature between about 50° F. and about 130° F. is maintained by continuously circulating the heat transfer medium through a suitable heat exchanger. In both operations, the urea droplets are maintained in contact with the medium until solidification is effected, and in most cases, solidification is almost instantaneous.

After the urea droplets have solidified, the urea prills are separated from the medium. In employing a circulating pool having a density higher than urea, the urea prills are withdrawn from the pool floating on the medium and may be separated by any of a wide variety of separation procedures, e.g., by passing the medium through a suitable screen. With a fixed pool having a density higher than urea, the urea prills may be skimmed from the surface of the pool. With a pool having a density lower than urea, the prills sink in the pool and are withdrawn from the bottom thereof. In any of these operations, the urea prills may then be further treated to separate any remaining heat transfer medium, e.g., the prills may be passed through a stream of warm dry air to vaporize any of the heat transfer medium absorbed on the urea prills. It should be readily apparent, however, that the separation and drying techniques are only illustrative and the scope of the invention is not to be limited thereby.

The preferred liquid heat transfer medium employed as a pool for solidifying the urea into prills, as noted hereinabove, is one in which the urea, in both a molten and solid state, both floats and is insoluble. The liquid heat transfer medium is preferably highly volatile and a water solvent; the former property facilitating the final separation of medium from urea by vaporization, and the latter property, facilitating residual water removal from molten urea. In general, the preferred liquid heat transfer medium employed in the pool has a boiling point above about 150° F. and a specific gravity above about 1.50, for example, carbon tetrachloride.

The invention will be further described with reference to an embodiment of the invention for continuously effecting the production of urea prills, in accordance with the above teachings. It is to be understood that in the drawing illustrating the embodiment all equipments are schematically represented and equipments such as valves and the like have been omitted to facilitate the understanding thereof. The choice of particular operating equipment and the placing of suitable valves and the like are deemed to be within the skill of those in the art from the teachings herein.

Referring now to the drawing, urea crystals are withdrawn from storage, generally indicated as 10, through line 11 and introduced into a surge hopper 12, which functions as a feeding device for a urea melter 13.

The urea melted in the melter 13, as known in the art, is introduced into a prilling device 14, such as a spray head or rotating basket, located at the top of a prilling chamber, generally indicated as 15. The prilling chamber 15 is further provided with a plurality of nozzles 16 for introducing a liquid heat transfer medium of the type hereinabove described, a pan or tank 17 filled with the heat transfer medium and an outlet 18. The prilling device 14 disperses the molten urea into a plurality of discrete droplets, in a manner known in the art, e.g., as illustrated in the copending application of Summerville, application Ser. No. 422,837 filed Dec. 21, 1964, now Patent No. 3,298,058, which are discharged into the surrounding atmosphere. Concurrently, the liquid heat transfer medium is sprayed into the prilling chamber 15 through the nozzles 16 and both the urea droplets and heat transfer medium fall into the tank or pan 17, located a suitable distance, such as 25 feet, below the prilling device 14. As a result of the fall through the surrounding atmosphere and contact with the spray of heat transfer medium, the urea droplets are hardened, and consequently penetrate the surface of the heat transfer medium in the pan 17 before returning to the surface of the medium. The heat transfer medium is continuously sprayed into the prilling chamber 15 at a temperature and rate of flow such that the urea prills are solidified before being withdrawn therefrom.

The urea prills float on the surface of the heat transfer medium in pan 17 and as a result of the contact therewith are solidified. The solid urea and heat transfer medium overflow the sides of the pan 17 and are withdrawn from the prilling chamber 15 through outlet 18.

The solid urea and heat transfer medium withdrawn from prilling chamber 15 through outlet 18 are introduced onto a screen conveyor 19. The large prills are retained on the screen conveyor 19 while the heat transfer medium and fine prills pass through the screen and into a collecting device 21. The urea prills are carried by the conveyor screen 19 through a drying zone 22, wherein the prills are contacted with a current of warm dry air, schematically indicated as 23, to evaporate remaining heat transfer medium therefrom. The temperature of the air and the contact time between the air and prills are controlled to provide the desired amount of heat transfer medium removal. The prills after passing through the drying zone 22 are discharged from the end of conveyor screen 19 into a suitable bin 24.

The heat transfer medium and fine urea prills collected in tank 21 are withdrawn therefrom through line 25 and introduced into a filter 26, such as a vacuum or centrifugal filter, to recover the fine prills. The fine prills are withdrawn from the filter 26 through line 27 and recycled to the urea crystal storage 10. The heat transfer medium is withdrawn from the filter 26 through line 28, and introduced into a tank 31. Make-up heat transfer medium is introduced into the tank 31 through line 32. The heat transfer medium is withdrawn from the tank 31 through line 33 passed through heat exchanger 34 to cool the heat transfer medium to the desired temperature and introduced into the prilling chamber, as hereinabove described.

Numerous modifications in the present invention are possible without departing from the scope thereof, so long as the prills are introduced into a heat transfer medium of the type hereinabove described to effect solidification thereof. Thus, for example, the processing operations described above may be combined into a single apparatus.

In a further modification, the urea droplets may be solidified in chamber 15 by contact with the liquid heat transfer medium spray and fall directly into a pool having a density less than urea.

In another modification, the urea droplets may be directly introduced into a pool containing a suitable heat transfer medium.

These and other modifications should be apparent to those skilled in the art from the teachings of this invention.

The following conditions are illustrative of the invention but the scope of the invention is not to be limited thereby.

The heat transfer medium is carbon tetrachloride.

| Line | 14 | 16 | 18 | 25 | 24 |
|---|---|---|---|---|---|
| Rate of flow (#/minute) | 1.0 | 21.5 | | 21.7 | 0.8 |
| Temperature (° F.) | 270–280 | 90 | 120–130 | 120–130 | |

The process of the invention is extremely effective for producing urea prills. The process is an improvement over the previous processes employing large prilling towers in that there is a smaller capital investment for equipment, a better control over the quality of the product because of the smaller installation and the independency from weather conditions which affect the temperature, humidity, etc., of the air employed in the prilling tower.

What is claimed is:
1. A process for producing urea prills comprising:
 (a) forming molten urea into a plurality of discrete droplets;
 (b) contacting the droplets with an inert liquid heat transfer medium in which urea is insoluble and which is at a temperature below the melting point of urea; and
 (c) maintaining the urea droplets in contact with the medium until the urea solidifies.
2. The process of claim 1 wherein the liquid heat transfer medium is in the form of a pool and the heat transfer medium is one in which the urea both floats and is insoluble.
3. The process of claim 2 wherein the droplets are surface hardened before being introduced into the medium.
4. The process of claim 3 wherein the urea prills are surface hardened by free fall through air.
5. The process of claim 2 wherein the heat transfer medium is carbon tetrachloride.
6. The process of claim 2 wherein the medium is maintained at a temperature of between about 50° F. and about 130° F.
7. The process of claim 2 wherein the medium is employed as a continuously circulating pool.
8. The process of claim 2 wherein the medium is employed as a fixed pool.
9. The process of claim 2 wherein the heat transfer medium is employed as a continuously circulating pool and further comprising: contacting the urea droplets with the heat transfer medium prior to introducing the urea into the pool, said heat transfer medium and the urea being introduced into the pool concurrently.
10. A process for producing urea prills comprising:
 (a) passing a plurality of discrete molten urea droplets in co-current contact with a liquid heat transfer medium, said heat transfer medium being a liquid in which urea is insoluble;
 (b) introducing the heat transfer medium and the urea droplets into a pool of the heat transfer medium, said pool being at a temperature which is below the melting point of urea;

(c) maintaining the urea droplets in contact with the heat transfer medium until the urea is solidified;
(d) withdrawing the heat transfer medium and the solidified urea from the pool;
(e) separating the heat transfer medium from the solidified urea;
(f) passing the heat transfer medium through a heat transfer zone to reduce the temperature thereof; and
(g) recycling the heat transfer medium to step (a).

11. The process of claim 10 wherein the heat transfer medium is one in which urea floats.

12. The process of claim 11 wherein the heat transfer medium is carbon tetrachloride.

References Cited

UNITED STATES PATENTS 3,130,225   4/1964   Friend _____ 264—14
3,058,159  10/1962   Ishizuka et al. _____ 264—13

ROBERT F. WHITE, *Primary Examiner.*
J. R. HALL, *Assistant Examiner.*

U.S. Cl. X.R.
264—13, 14